United States Patent
Tso

Patent Number: 6,109,375
Date of Patent: Aug. 29, 2000

[54] METHOD AND APPARATUS FOR FABRICATING ROTARY CONE DRILL BITS

[75] Inventor: Lawrence L. Tso, Glenn Heights, Tex.

[73] Assignee: Dresser Industries, Inc., Dallas, Tex.

[21] Appl. No.: 09/248,720

[22] Filed: Feb. 10, 1999

Related U.S. Application Data

[60] Provisional application No. 60/075,743, Feb. 23, 1998.

[51] Int. Cl.[7] .................................................. E21B 10/20
[52] U.S. Cl. ......................... 175/366; 175/367; 175/375
[58] Field of Search .................................. 175/366, 367, 175/375; 76/108.2; 228/182, 212; 29/464

[56] References Cited

U.S. PATENT DOCUMENTS

| | | | |
|---|---|---|---|
| T969,007 | 4/1978 | Goetz | 219/121 |
| 2,875,984 | 3/1959 | Goodwin . | |
| 2,950,090 | 8/1960 | Swart | 175/375 |
| 3,907,191 | 9/1975 | Lichte | 228/182 |
| 3,987,859 | 10/1976 | Lichte | 175/375 |
| 4,045,646 | 8/1977 | Lichte | 219/121 |
| 4,054,772 | 10/1977 | Lichte | 219/121 |
| 4,098,448 | 7/1978 | Sciaky et al. | 228/102 |
| 4,136,586 | 1/1979 | Neilson et al. | 764/108 |
| 4,209,124 | 6/1980 | Baur et al. | 228/182 |
| 4,209,684 | 6/1980 | Evans | 219/121 |
| 4,210,270 | 7/1980 | Garner | 228/103 |
| 4,229,638 | 10/1980 | Lichte | 219/121 |
| 4,414,734 | 11/1983 | Atkinson | 29/464 |
| 4,507,843 | 4/1985 | Atkinson | 29/466 |
| 4,559,852 | 12/1985 | Atkinson | 76/108 |
| 4,617,446 | 10/1986 | Anderson | 219/121 |
| 4,741,471 | 5/1988 | Sullivan | 228/166 |
| 4,770,068 | 9/1988 | Shaw et al. | 76/108 |
| 4,794,822 | 1/1989 | Parrish et al. | 76/108 |
| 5,439,068 | 8/1995 | Huffstutler et al. | 175/356 |
| 5,513,715 | 5/1996 | Dysart | 175/371 |
| 5,524,510 | 6/1996 | Davies et al. | 76/108 |
| 5,579,856 | 12/1996 | Bird | 175/375 |
| 5,636,700 | 6/1997 | Shamburger, Jr. | 175/331 |

*Primary Examiner*—Hoang Dang
*Attorney, Agent, or Firm*—Groover & Associates

[57] ABSTRACT

A method and apparatus are provided for use in fabricating rotary cone drill bits from multiple drill bit segments. Each drill bit segment (40) preferably includes a first portion (50) with mating surfaces (61, 62) designed to be aligned with mating surfaces (61, 62) of other drill bit segments (40) and a second portion (80) which includes a support arm (90) with a cutter cone assembly (100) rotatably mounted thereon. A recess (70) having a generally spherical surface is formed within the first portion (50) of each drill bit segment (40) such that when the respective drill bit segments (40) are aligned with each other, the spherical recesses (70) cooperate with each other to define a generally spherical cavity. A ball (72) is disposed within the resulting spherical cavity when the drill bit segments are joined with each other to form the bit body (42) for the resulting rotary cone drill bit (20). The ball (72) and spherical recesses (70) cooperate with each other to allow alignment of the respective drill bit segments (40) relative to each other prior to welding.

20 Claims, 4 Drawing Sheets

METHOD AND APPARATUS FOR FABRICATING ROTARY CONE DRILL BITS

RELATED APPLICATION

This application claims the benefit of previously filed provisional Patent Application Ser. No. 60/075,743 filed Feb. 23, 1998 entitled "Method and Apparatus for Fabricating Rotary Cone Drill Bits."

TECHNICAL FIELD OF THE INVENTION

The present invention relates generally to drill bits used in drilling boreholes in the earth, and more particularly to a method and apparatus for fabricating a rotary cone drill bit from multiple drill bit segments.

BACKGROUND OF THE INVENTION

Various types of rotary drill bits or rock bits may be used to form a borehole in the earth. Examples of such rock bits include roller cone drill bits or rotary cone drill bits used in drilling oil and gas wells. A typical roller cone drill bit includes a bit body with an upper end adapted for connection to a drill string. A plurality of drill bit segments, typically three, is frequently used to form the bit body. Each drill bit segment preferably includes a support arm which extends from a lower end of the bit body. Each support arm also includes a spindle or journal protruding generally radially inward and downward with respect to a projected rotational axis of the bit body. An enlarged generally cylindrical cavity is preferably formed in the bit body to receive drilling fluids from the drill string.

A cutter cone assembly is generally mounted on each spindle and rotatably supported on bearings acting between the spindle and the interior of a cavity or chamber formed within each cutter cone assembly. One or more nozzle housings may be formed on the bit body adjacent to the support arms. A nozzle is typically positioned within each housing to direct drilling fluid passing downwardly from the drill string through the bit body toward the bottom of the borehole being formed. Drilling fluid is generally provided by the drill string to perform several functions including washing away material removed from the bottom of the borehole, cleaning the cutter cone assemblies, and carrying the cuttings radially outward and then upward within an annulus defined between the exterior of the bit body and the wall of the borehole.

Various techniques have previously been used to weld or attach the drill bit segments with each other to form a rotary cone drill bit. U.S. Pat. No. 4,054,772, entitled "*Positioning System for Rock Bit Welding*" shows apparatus for positioning three drill bit segments relative to each other followed by laser welding to join the drill bit segments with each other to form a bit body with three support arms and respective cutter cone assemblies extending therefrom.

U.S. Pat. No. 3,907,191, entitled "*Method of Constructing a Rotary Rock Bit*" discloses a method and apparatus for constructing a rotary cone rock bit with an accurate gauge size from multiple drill bit segments. The '191 Patent discloses "scissoring" of drill bit segments relative to each other to establish the desired gauge diameter for the resulting rotary cone drill bit.

U.S. Pat. No. 3,987,859, entitled "Unitized Rotary Rock Bit" discloses a method and apparatus for positioning drill bit segments relative to each other to allow an electron beam gun to form a rotary cone drill bit by welding the segments with each other. The '859 Patent also shows inserting a dowel in adjacent holes in the respective drill bit segments to aid in aligning the drill bit segments with each other prior to welding.

U.S. Pat. No. 4,045,646, entitled "*Positioning Fixture for Rock Bit Welding*" discloses an apparatus which may be satisfactorily used to position drill bit segments relative to each other and to weld adjacent drill bit segments with each other to form a rotary cone drill bit.

U.S. Pat. No. 4,414,734 entitled "Triad for Rock Bit Assembly" shows a triad which may be positioned in respective holes in three drill bit segments to assist with aligning the drill bit segments with each other prior to welding.

SUMMARY OF THE INVENTION

In accordance with teachings of the present invention, disadvantages and problems associated with fabrication and assembly of previous rotary cone drill bits from multiple drill bit segments have been substantially reduced or eliminated. In one aspect of the present invention, three drill bit segments are provided with each drill bit segment having respective mating surfaces that cooperate with each other to allow welding each drill bit segment to adjacent drill bit segments to form a bit body. A generally spherical recess is preferably formed in each drill bit segment. During assembly of the drill bit segments in preparation for welding, a ball is preferably placed in the spherical recess of one drill bit segment. The drill bit segments are then positioned adjacent to each other such that the associated spherical recesses cooperate with each other to form a generally closed spherical cavity to trap the ball therein.

In accordance with teachings of the present invention, multiple drill bit segments are provided with each drill bit segment having a generally irregular, elongated configuration defined in part by an interior surface and an exterior surface. Two mating surfaces are preferably formed on the interior of each drill bit segment with the mating surfaces disposed at an angle of approximately 120° relative to each other. The mating surfaces extend from a first end of each drill bit segment to a location intermediate a second end of the respective drill bit segment. A generally spherical recess is preferably formed in the interior surface of each drill bit segment at a junction between the respective mating surfaces intermediate the first end and the second end of the respective drill bit segment.

Technical advantages of the present invention result from placing a ball within generally spherical recesses formed respectively on the interior surface of multiple drill bit segments with each drill bit segment having a spindle or journal with a cutter cone assembly rotatably mounted thereon. The ball and the spherical recesses cooperate with each other to maintain the desired longitudinal spacing of the cutter cone assemblies relative to each other to prevent cone interference while positioning the drill bit segments relative to each other prior to welding. The spherical recesses and the ball cooperate with each other to maintain the desired cone height and the desired gauge diameter of the resulting rotary cone drill bit within acceptable limitations. The ball and spherical recesses also cooperate with each other to establish a pivot point within the interior of the associated drill bit segments to allow adjusting the position of the drill bit segments relative to each other prior to welding while maintaining relative concentric alignment of the drill bit segments relative to each other and a projected axis of rotation for the resulting drill bit. One result of this generally concentric alignment is maintaining a more uniform wall thickness of an enlarged, generally cylindrical cavity formed in the bit body during threading of the bit body.

Further technical advantages of the present invention include maintaining desired dimensional tolerances of drill bit diameter and location of the cutter cone assemblies relative to the drill bit body even though the dimensions of the drill bit segments used to assemble the resulting drill bit may have less than desired dimensional tolerances. As a result of fabricating rotary cone drill bits from multiple drill bit segments in accordance with teachings of the present invention, the scrap rate for drill bits noncompliance with dimensional tolerances is decreased and the resulting drill bits have improved downhole performance due to enhanced dimensional integrity corresponding with the original design dimensions for the associated rotary cone drill bit. Assembling a rotary cone drill bit in accordance with teachings of the present invention substantially reduces or eliminates variations between originally designed dimensions and the as-built dimensions of the resulting rotary cone drill bit. Teachings of the present invention substantially reduce or eliminate scrap and rework associated with fabricating rotary cone drill bits from multiple drill bit segments.

Other technical advantages of the present invention will be readily apparent to one skilled in the art form the following figures, description, and claims.

BRIEF DESCRIPTION OF THE DRAWINGS

For a more complete understanding of the present invention, and the advantages thereof, reference is now made to the following brief descriptions, taken in conjunction with the accompanying drawings and detailed description, wherein like reference numerals represent like parts, in which.

DETAILED DESCRIPTION OF THE INVENTION

Figure 1:
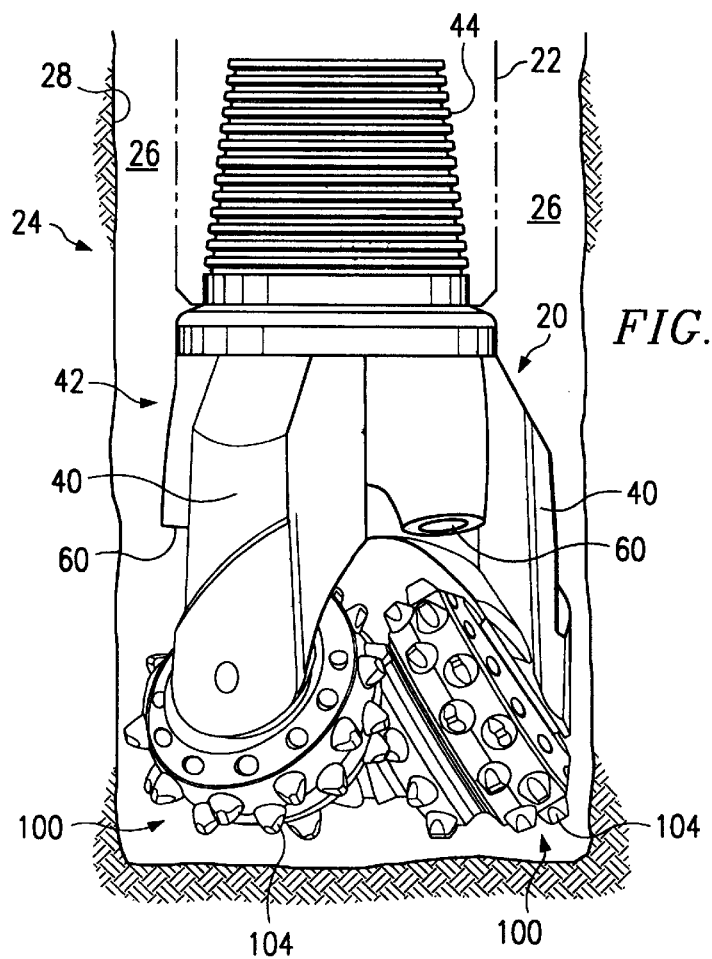
FIG. 1 is a schematic drawing in elevation and section with portions broken away showing a rotary cone drill bit, incorporating features of the present invention disposed in a well bore.

The preferred embodiments of the present invention and its advantages are best understood by referring now in more detail to FIGS. 1–6 of the drawings, in which like numerals refer to like parts.

The present invention may be embodied in a rotary cone drill bit 20 or any other type of drill bit formed from multiple segments and used in drilling a borehole in the earth. Rotary cone drill bit 20 may sometimes be referred to as a "rotary drill bit" or "rock bit." Rotary cone drill bit 20 is shown in the drawings for purposes of illustration and preferably includes threaded connection or pin 44 for attachment to drill string 22. Threaded connection 44 and a corresponding threaded connection (not expressly shown) associated with drill string 22 are designed to allow rotation of drill bit 20 in response to rotation of drill string 22 at the well surface (not expressly shown).

As shown in FIG. 1, drill bit 20 may be attached to drill string 22 and disposed in borehole 24. Annulus 26 is formed between the exterior of drill string 22 and interior wall 28 of borehole 24. In addition to rotating drill bit 20, drill string 22 is often used to provide a conduit for communicating drilling fluids and other fluids from the well surface to drill bit 20 at the bottom of borehole 24. Such drilling fluids may be directed to flow from drill string 22 through enlarged, generally cylindrical cavity 30 (see FIG. 2) provided in drill bit 20 to various nozzles 60. Cuttings formed by drill bit 20 and any other debris at the bottom of borehole 24 will mix with drilling fluids exiting from nozzles 60 and return to the well surface via annulus 26. The debris carrying fluid generally flows radially outward from beneath drill bit 20 and then flows upward toward the well surface through annulus 26.

Figure 2:
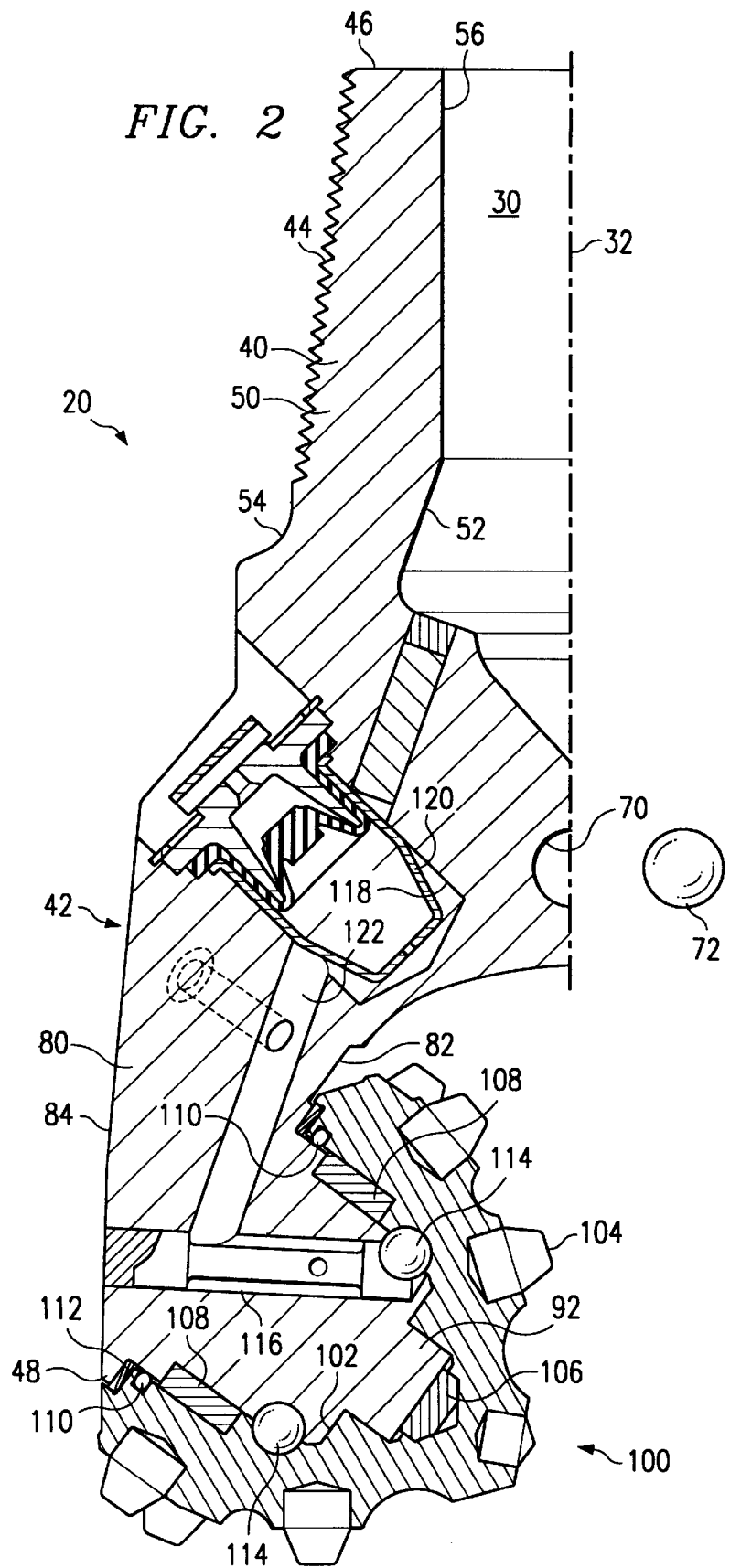
FIG. 2 is a schematic drawing in section with portions broken away showing an exploded view of a bit body incorporating an embodiment of the present invention.

The present invention may be incorporated into the manufacture and assembly of a wide variety of rotary cone drill bits which are fabricated in part from drill bit segments. Drill bit 20, as shown in FIGS. 1 and 2, is preferably fabricated from three drill segments 40. Various welding techniques such as electron beam welding, laser welding or any other suitable welding processes may be used to join drill bit segments 40 with each other to form the associated drill bit 20.

For rotary cone drill bit 20, cutting action or drilling action occurs as cutter cone assemblies 100, sometimes referred to as "rotary cone cutters" or "roller cone cutters," are rolled around the bottom of borehole 24 by rotation of drill string 22. Failure to maintain the dimensional relationship between cutter cone assemblies 100 within designed tolerances may substantially reduce the downhole performance of the associated rotary cone drill bit 20. Unequal loading of cutter cone assemblies 100 may result from inaccurate longitudinal or radial alignment of cutter cone assemblies 100 relative to each other during fabrication of rotary cone drill bit 20. Such undesired variations in the positioning of cutter cone assemblies 100 may result in poor downhole performance of the associated rotary cone drill bit 20.

Cutter cone assemblies 100 cooperate with each other to form interior wall 28 or the inside diameter of borehole 24 in response to rotation of drill bit 20. The resulting inside diameter of borehole 24 defined by wall 28 corresponds approximately with the combined outside diameter or gauge diameter of cutter cone assemblies 100. Therefore, careful positioning of drill bit segments 40 and their associated cutter cone assemblies 100 relative to each is an important step to ensure that the resulting drill bit 20 will form borehole 24 with the required inside diameter. For some applications drilling fluid exiting from nozzles 60 may apply hydraulic energy to the bottom borehole 24 to assist cutter cone assemblies 100 in forming borehole 24.

Figure 3:
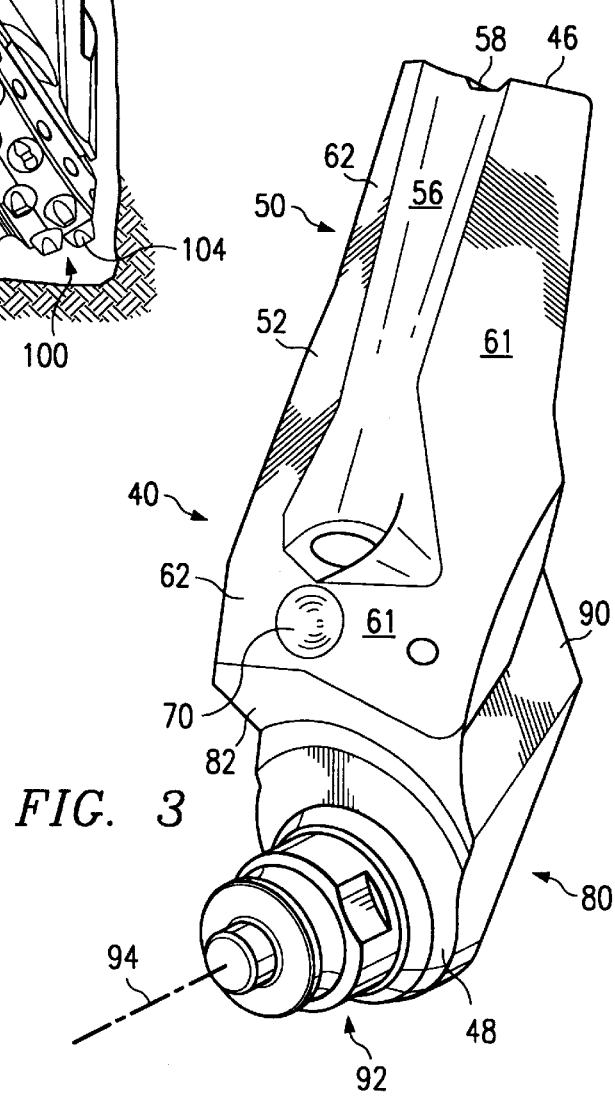
FIG. 3 is an enlarged schematic drawing showing an isometric view of a drill bit segment incorporating an embodiment of the present invention during an intermediate manufacturing step.

As shown in FIGS. 1–3, each cutter cone assembly 100 includes protruding inserts 104 which scrape and gouge against the sides and bottom of borehole 24 in response to the weight and rotation applied to drill bit 20 from drill string 22. The position of inserts 104 for each cutter cone assembly 100 may be varied to provide the desired downhole cutting action. Cutter cone assembly 100 may be manufactured of any hardenable steel or other high strength engineering alloy which has adequate strength, toughness, and wear resistance to withstand the rigors of downhole drilling. Other types of cutter cone assemblies may be satisfactorily used with the present invention including, but not limited to, cutter cone assemblies having milled teeth instead of inserts 104. U.S. Pat. No. 5,579,856 entitled "*Gage Surface and Method for Milled Tooth Cutting Structure*" shows an example of a cutter cone assembly with milled teeth.

Three support arms 90 (FIG. 3) are shown attached to and extending longitudinally from bit body 42 opposite from threaded connection 44. Each support arm 90 preferably includes spindle 92 formed thereon and extending from second portion 80 of drill bit segment 40. One aspect of the present invention includes the ability to selectively position drill bit segments 40 relative to each other without substantially changing the longitudinal position of cutter cone assemblies 100 relative to each other. Longitudinal axis or centerline 32 extends through bit body 42 and corresponds generally with the projected axis of rotation for drill bit 20.

Each cutter cone assembly 100 is preferably constructed and mounted to its associated spindle 92 in a substantially identical manner. Each support arm 90 is preferably formed on second portion 80 of each drill bit segment 40 in substantially the same manner. Therefore, only one support arm 90 and cutter cone assembly 100 will be described in detail since the same description applies generally to the other two support arms 90 and their associated cutter cone assemblies 100.

Each drill bit segment 40 preferably includes first portion 50 which is sized to be compatible with first portions 50 of other drill bit segments 40 to form bit body 42. Each drill bit segment 40 also includes second portion 80 which provides support arm 90 and respective spindle or journal 92. Support arm 90 which is formed on second portion 80 of each drill bit segment 40 extends longitudinally from bit body 42 opposite from threaded connection 44.

Each cutter cone assembly 100 includes an internal cavity 102 shaped to be rotatably mounted on the respective spindle or journal 92. For the embodiment shown in FIG. 2, thrust button 106 is disposed within internal cavity 102 between the end of spindle 92 and the adjacent end of internal cavity 102. Journal bearing or bushing 108 is also disposed between the exterior of spindle 92 and the inside diameter of internal cavity 102. Elastomeric seal 110 is located at the opening or mouth of internal cavity 102 to provide a fluid seal between internal cavity 102 and the adjacent portions of spindle 92. Seal gland 112 is also disposed outwardly from elastomeric seal 110.

The present invention may be satisfactorily used with a wide variety of bearing assemblies and sealing systems associated with mounting a cutter cone assembly on a respective spindle of a rotary cone drill bit. The present invention is not limited to use with bearing assemblies and sealing systems such as shown in FIG. 2.

Cutter cone assembly 100 is retained on spindle 92 by a plurality of balls or ball bearings 114 inserted through ball passage 116 formed in spindle 92. Lubricant cavity 118 is preferably formed within each drill bit segment 40. Lubricant reservoir 120 is preferably disposed within each lubricant cavity 118. Lubricant passageway 122 and other suitable openings and lubricant flow paths are preferably formed within second portion 80 of each drill bit segment 40 to communicate lubricant between internal cavity 102 and lubricant reservoir 120. Additional information concerning the lubricant system shown in FIG. 2 may be found in U.S. Pat. No. 5,513,715 entitled "*Flat Seal for a Roller Cone Rock Bit.*"

The present invention may be satisfactorily used with rotary cone drill bits having a wide variety of lubricant systems and cutter cone assembly retaining systems. The present invention is not limited to use with cutter cone assembly 100 or lubricant reservoir 120 as shown in FIG. 2.

One aspect of the present invention includes forming recess 70 having a generally spherical configuration within each drill bit segment 40 at a location selected in accordance with teachings of the present invention. When the respective drill bit segments 40 are joined with each other to form bit body 42, the respective spherical recesses 70 will cooperate with each other to form a generally closed spherical cavity having dimensions compatible with ball or ball bearing 72. The size of spherical recess 70 and therefore, the size of ball bearing 72 will vary proportionally with the size of rotary cone drill bit 20.

Drill bit segment 40, incorporating one embodiment of the present invention, shown in FIG. 3 illustrates an intermediate manufacturing step. Drill bit segment 40 is representative of only one type of drill bit segment which may be satisfactorily used to manufacture a rotary cone drill bit in accordance with teachings of the present invention.

As shown in FIGS. 2 and 3, each drill bit segment 40 has a generally irregular, elongated configuration defined in part by first portion 50 and second portion 80. Each drill bit segment 40 also includes an exterior surface and an interior surface extending from first end 46 to second end 48 of each drill bit segment 40. For purposes of explanation first portion 50 of drill bit segment 40 will be described as having interior surface 52 and exterior surface 54. In a similar manner, second portion 80 of drill bit segment 40 will be described with respect to interior surface 82 and exterior surface 84. However, as shown in FIGS. 2 and 3, interior surfaces 52 and 82 cooperate with each other to define in part the interior surface of drill bit segment 40. In a similar manner, exterior surfaces 54 and 84 cooperate with each other to define in part the exterior surface of drill bit segment 40.

Drill bit segment 40 may be formed from a suitable steel alloy such as AISI 8620 by forging or other suitable techniques. First portion 50 of drill bit segment 40 may sometimes be referred to as the "shank." The portion of second end 48 where interior surface 82 joins exterior surface 84 may sometimes be referred to as the "shirttail."

As shown in FIGS. 1 and 3, an elongated channel 56 is preferably formed within interior surface 52 of first portion 50 of each drill bit segment 40. Elongated channel 56 extend from first end 46 of each drill bit segment 40 to a position adjacent to spherical recess 70. Elongated channels 56 cooperate with each other to allow forming enlarged, generally cylindrical cavity 30 within the resulting bit body 42 as shown in FIG. 4.

Figure 4:
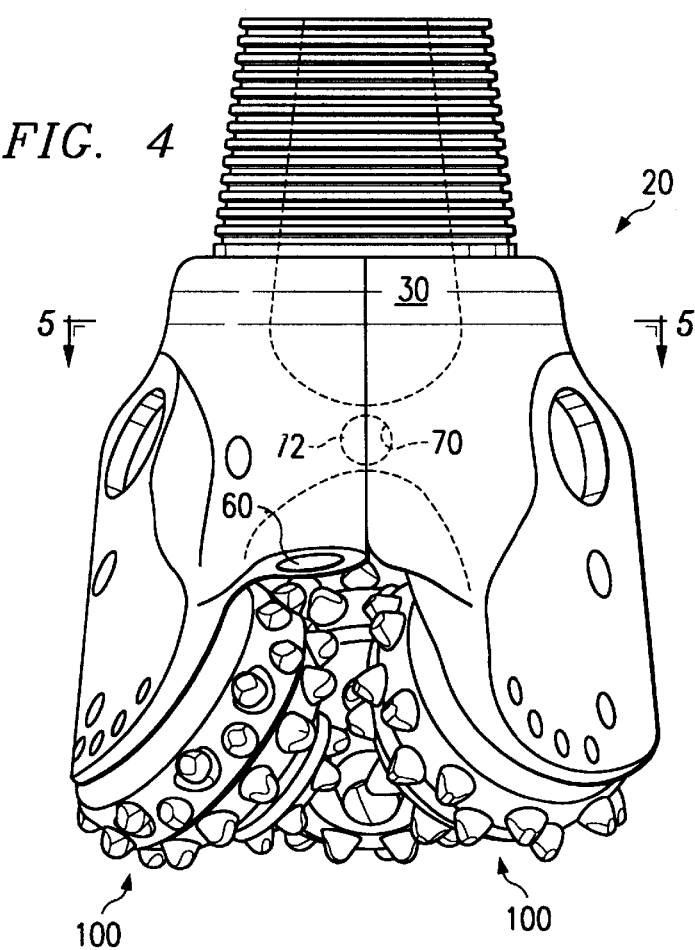
FIG. 4 is a schematic drawing in elevation showing a rotary cone drill bit fabricated from three drill bit segments incorporating an embodiment of the present invention during an intermediate manufacturing step.

As shown in FIGS. 3 and 4, enlarged cavity 56 may be formed within first portion 50 of drill bit segment 40. Fluids may be communicated between string 22 and cavity 56. Cavity 56 preferably has a generally uniform inside diameter extending from first end 46 to a position intermediate first end 46 and second end 48 of drill bit segments 40. For some applications, cavity 56 may be formed concentric with longitudinal centerline 32 of drill bit segments 40.

As illustrated in FIG. 3, support arm 90 and journal or spindle 92 may also be machined from second portion 80 of each drill bit segment 40 prior to forming bit body 42. Each spindle 92 includes longitudinal axis 94 extending therethrough. The various bearing surfaces and sealing surfaces associated with spindle 92 are preferably machined concentric with longitudinal axis 94. Longitudinal axis 94 is typically used as a reference point for establishing the various dimensions and tolerances associated with manufacturing drill bit segments 40 and fabricating rotary cone drill bit 20. The dimensions of the associated interior surface 82 and exterior surface 84 may be selected depending upon the desired dimensions for the resulting drill bit 20 and the respective cutter cone assembly 100 which will be mounted on each respective spindle 92.

Figure 5:
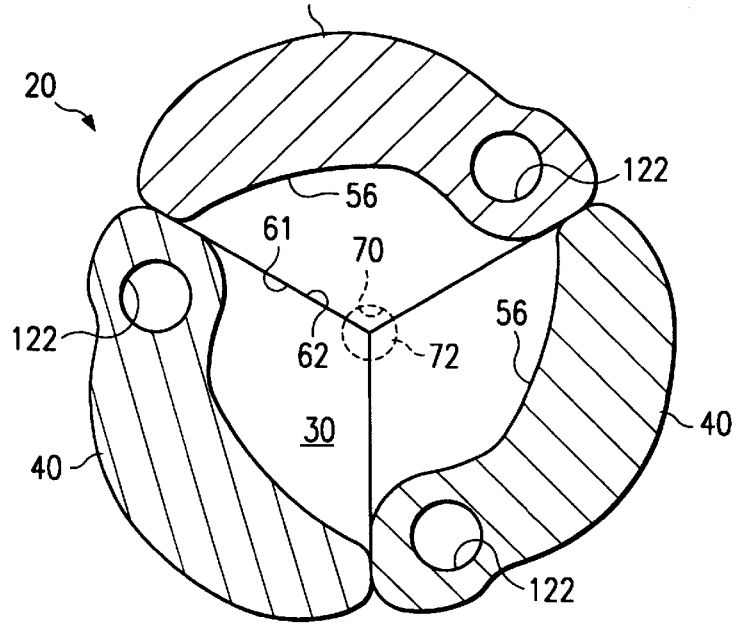
FIG. 5 is a drawing in section taken along lines 5—5 of FIG. 4.
Figure 6:
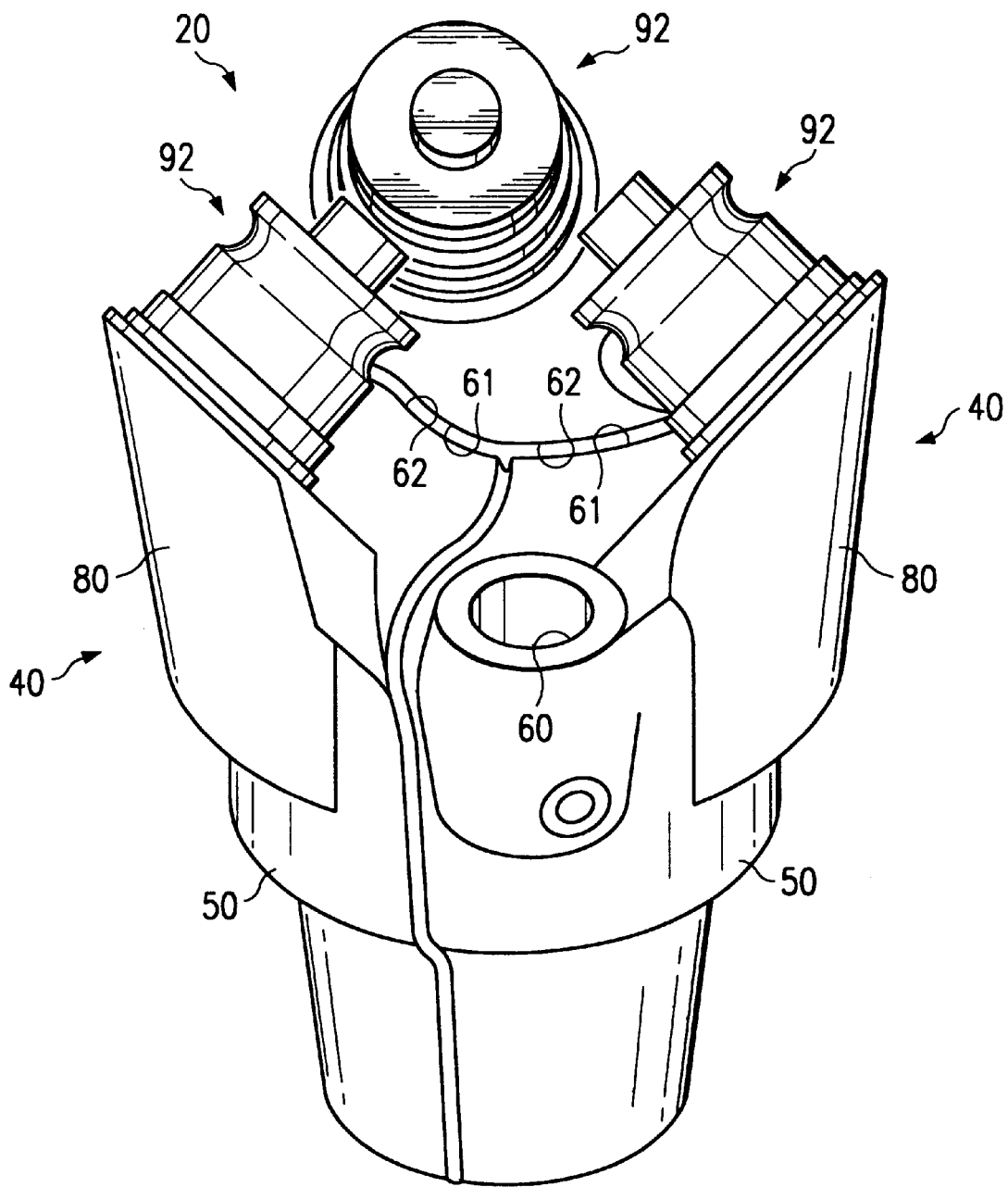
FIG. 6 is a schematic drawing in elevation with portions broken away showing three drill bit segments incorporating teachings of the present invention with the drill bit segments aligned relative to each other prior to welding.

A pair of mating surfaces 61 and 62, as shown in FIGS. 3 and 6, are formed on interior surface 52 of first portion 50 of each drill bit segment 40. Elongated channel 56 is disposed between the respective mating surfaces 61 and 62. For those applications in which three drill bit segments 40 are used to form bit body 42, mating surfaces 61 and 62 are preferably formed at an angle of approximately one hundred and twenty degrees (120°) relative to longitudinal centerline 32, as shown in FIG. 5. Longitudinal centerline 32 corresponds generally with the projected axis of rotation of the resulting drill bit 20 when attached to drill string 22. For those applications in which only two drill bit segments are used to form the associated bit body, mating surfaces 61 and 62 are preferably formed at an angle of approximately one hundred and eighty degrees (180°) relative to the longitudinal center line of the respective drill bit segments.

Various machining techniques may be used to insure that mating surfaces 61 and 62 are compatible with corresponding mating surfaces 61 and 62 of the other drill bit segments 40 used to form bit body 42. For some applications a V-shaped milling machine may be used to form mating surfaces 61 and 62 on opposite sides of longitudinal centerline 32.

Mating surfaces 61 and 62 are formed generally parallel with longitudinal centerline 32. Mating surfaces 61 and 62 are spaced from each other at first end 46 and intersect with each other at a location intermediate first end 46 and second end 48 of each drill bit segment 40. This intersection of mating surfaces 61 and 62 corresponds generally with longitudinal centerline 32. As illustrated in FIGS. 2 and 3, generally spherical recess 70 is preferably formed on interior surface 52 of each drill bit segment 40 at the intersection between first mating surface 61 and second mating surface 62. Various milling techniques may be used to form spherical recess 70.

Spherical recess 70 preferably has approximately the same radius in each drill bit segments 40 used to form bit body 42. Ball bearing 72 is preferably selected to have a radius which is approximately equal to the radius associated with spherical recess 70. As a result, when drill bit segments 40 are disposed adjacent to each other, such as shown in FIGS. 4, 5 and 6, spherical recesses 70 cooperate with each other to form a generally enclosed spherical cavity with ball 72 trapped therein.

After cutter cone assemblies 100 are mounted on their respective spindles 92, mating surfaces 61 and 62 of drill bit segments 40 are preferably positioned in a close abutting relationship with respect to each other. FIG. 6 illustrates one such positioning of drill bit segments 40 for a drill bit 20 having three drill bit segments 40. A welding fixture (not expressly shown) may be used to clamp drill bit segments 40 in their desired position prior to welding.

As shown in FIG. 3, notch 58 is preferably machined in first end 46 of each drill bit segment 40. Notch 58 and respective lugs (not expressly shown) provided by an associated welding fixture (not expressly shown) may be used to initially position drill bit segments 40 relative to each other within the welding fixture. A ring gauge (not expressly shown) may then be positioned around cutter cone assemblies 100 and the exterior 84 of second portion 80 of each drill bit segment 40 to establish the desired composite outside diameter for rotary cone drill bit 20. Drill bit segments 40 may be moved or skewed relative to each other to establish the desired gauge diameter. Such movement is particularly required if the as-built dimensions for one or more drill bit segments 40 varies from the designed dimensions.

Movement of drill bit segments 40 relative to each other may result in a sliding or scissoring movement of mating surfaces 61 and 62 relative to each other. For example, first end 46 may have irregularities such that movement of the associated drill bit segment 40 will result in a substantial change in the longitudinal and radial positioning of the associated cutter cone assembly 100. By placing ball bearing 72 within spherical recesses 70, the position of drill bit segments 40 may be adjusted relative to each other to obtain the desired overall outside diameter for drill bit 20 without substantially changing the longitudinal position of cutter cone assemblies 100 relative to each other. Without the use of recesses 70 and ball bearing 72, movement of drill bit segments 40 relative to each other results in a "scissoring" movement which may substantially alter the longitudinal position of cutter cone assemblies 100 relative to each other. For some applications, such movement of drill bit segments 40 relative to each other may result in interference contact between respective cutter cone assemblies 100.

Placing ball bearing 72 within spherical recesses 70 also maintains the desired general radial position of drill bit segments 40 relative to each other. As best shown in FIG. 5, the position of each drill bit segment 40 remains relatively concentric with respect to longitudinal centerline 32. As a result, enlarged generally cylindrical cavity 30 may be machined within of bit body 42 with a relatively uniform wall thickness. Without the use of spherical recesses 70 and ball bearing 72 the scissoring movement associated with aligning drill bit segments 40 relative to each other may result in a substantial offset of one or more elongated channels 56 relative to longitudinal centerline 32. As a result, when threaded connection 44 is machined on the exterior of bit body 42, the wall thickness in the offset drill bit segment 40 may be substantially reduced such that the associated drill bit 20 must be scrapped or reworked.

Interior surfaces 52 and 82 and exterior surfaces 54 and 84 may be modified as desired for various downhole applications. The configuration of interior surfaces 52 and 82 and exterior surfaces 54 and 84 may be varied substantially between first end 46 and second end 48 of drill bit segment 40. Interior surface 82 and exterior surface 84 are contiguous at second end 48 of drill bit segment 40.

The size of drill bit 20 is determined by the maximum outside diameter or gauge diameter associated with the three cutter cone assemblies 100. The position of each cutter cone assembly 100 and their combined gauge diameter relative to the projected axis of rotation of drill bit 20 is a function of the dimensions of drill bit segments 40, the associated support arms 90 with cutter cone assemblies 100 mounted respectively thereon, and the orientation of drill bit segments 40 relative to each other.

Although the present invention has been described by several embodiments, various changes and modifications may be suggested to one skilled in the art. It is intended that the present invention encompasses such changes and modifications as fall within the scope of the present appended claims.

What is claimed is:

1. A rotary cone drill bit for forming a borehole, the drill bit comprising:
   a bit body formed from a number of drill bit segments, each drill bit segment having a first portion and a second portion;
   an interior surface formed on both the first portion and the second portion of each drill bit segment and an exterior surface formed on both the first portion and the second portion of each drill bit segment;
   the first portion of each drill bit segment having two mating surfaces formed on the interior surface thereof, the mating surfaces sized to be compatible with respective mating surfaces of another drill bit segment disposed adjacent thereto;
   each drill bit segment having a first end and a second end wherein the mating surfaces are spaced from each other at the first end and joined with each other intermediate the first end and the second end of the respective drill bit segment;
   a generally spherical recess formed on the interior surface of each drill bit segment at the junction of the respective mating surfaces;
   a substantially closed spherical cavity formed by the generally spherical recesses on the interior surfaces of each drill bit segment when the mating surfaces of adjacent drill bit segments are joined together to form the bit body; and
   a ball disposed within the spherical cavity defined by the spherical recesses.

2. The drill bit of claim 1 further comprising a threaded connection formed on the bit body for attaching the rotary cone drill bit to a drill string for rotation of the drill bit.

3. The drill bit of claim 2 further comprising the threaded connection formed on the exterior surface of the first portion of each drill bit segment after the drill bit segments have been welded to each other to form the bit body.

4. The drill bit of claim 2 further comprising an enlarged cavity formed within the first portion of the drill bit segments for communicating fluids between the drill string and the cavity.

5. The drill bit of claim 2 wherein the second portion of each drill bit segment extends from the bit body opposite from the threaded connection.

6. The drill bit of claim 1 further comprising:
   a spindle attached to and projecting inwardly from the interior surface of the second portion of each drill bit segment; and
   a number of cutter cone assemblies with one cutter cone assembly being rotatably mounted on each spindle.

7. The drill bit of claim 1 wherein the mating surfaces of each drill bit segment are disposed at an angle of approximately one hundred and twenty degrees relative to a longitudinal centerline of the respective drill bit segment.

8. The drill bit of claim 7 further comprising:
   the bit body having a longitudinal centerline corresponding generally with a projected axis of rotation of the drill bit; and
   the spherical cavity and the ball cooperate with each other to maintain an approximately parallel alignment between the longitudinal centerline of the respective drill bit segment and the longitudinal centerline of the bit body.

9. The drill bit of claim 1 further comprising:
   an elongated channel formed in the interior surface of the first portion of each drill bit segment;
   each elongated channel extending from the respective first end to a position adjacent to the generally spherical recess; and
   the elongated channels cooperating with each other to define a generally cylindrical cavity in the bit body for receiving fluids from a drill string attached to the drill bit.

10. The drill bit of claim 1 further comprising:
    a first radius associated with each generally spherical recess formed on the interior surface of each drill bit segment; and
    a second radius associated with the ball disposed within the spherical cavity, the second radius of the ball being approximately equal to the first radius of each spherical recess.

11. A drill bit segment for use in forming a rotary cone drill bit, the drill bit segment comprising:
    a first end and a second end with a first portion and a second portion disposed therebetween;
    an exterior surface formed on the first portion and the second portion extending from the first end to the second end;
    an interior surface formed on the first portion and the second portion extending from the first end to the second end;
    two mating surfaces formed on the interior surface of the first portion and sized to be compatible with corresponding mating surfaces of a drill bit segment disposed adjacent thereto;
    the mating surfaces spaced from each other at the first end and joined with each other intermediate the first end and the second end of the drill bit segment; and
    a generally spherical recess formed on the interior surface of the drill bit segment at the junction of the respective mating surfaces and sized to receive approximately one-third of a ball disposed therein during assembly of the drill bit segment with two other corresponding drill bit segments.

12. The drill bit segment of claim 11 further comprising:
    an elongated channel formed in the interior surface of the first portion disposed between the mating surfaces; and
    the elongated channel extending from the first end to a position adjacent to the generally spherical recess.

13. The drill bit segment of claim 11 further comprising:
    a spindle attached to and projecting inwardly from the interior surface of the second portion; and
    a cutter cone assembly rotatably mounted on the spindle.

14. The drill bit segment of claim 11 further comprising a notch formed in the first end.

15. A method of fabricating a rotary cone drill bit from multiple drill bit segments wherein each drill bit segment has a first end and a second end and two mating surfaces formed on an interior surface of the respective drill bit segment, the method comprising:
    forming a spherical recess in each drill bit segment at an intersection of the respective mating surfaces intermediate the first end and the second end;
    placing a ball in one of the spherical recesses; and
    positioning the drill bit segments adjacent to each other such that a portion of the ball is disposed in each of the respective spherical recesses and the mating surfaces of adjacent drill bit segments are in close proximity to each other to accommodate welding the drill bit segments together to form a bit body for the rotary cone drill bit.

16. The method of claim 15 further comprising the step of forming the bit body from three drill bit segments.

17. The method of claim 15 further comprising the steps of:
    forming each drill bit segment with a longitudinal center line extending therethrough; and
    forming the mating surfaces at an angle of approximately one hundred and twenty degrees relative to the longitudinal center line.

18. The method of claim 15 further comprising the steps of forming each spherical recess and the ball with approximately the same radius.

19. The method of claim 15 further comprising the step of adjusting the position of the drill bit segments relative to each other to establish a desired outside diameter for the rotary cone drill bit prior to welding the drill bit segments with each other.

20. The method of claim 15 further comprising the step of forming a notch in the first end of each drill bit segment.

\* \* \* \* \*